Aug. 11, 1936.  W. W. TRICKEY  2,050,985
METHOD FOR TAPPING PIPE
Filed Jan. 29, 1934   2 Sheets-Sheet 1
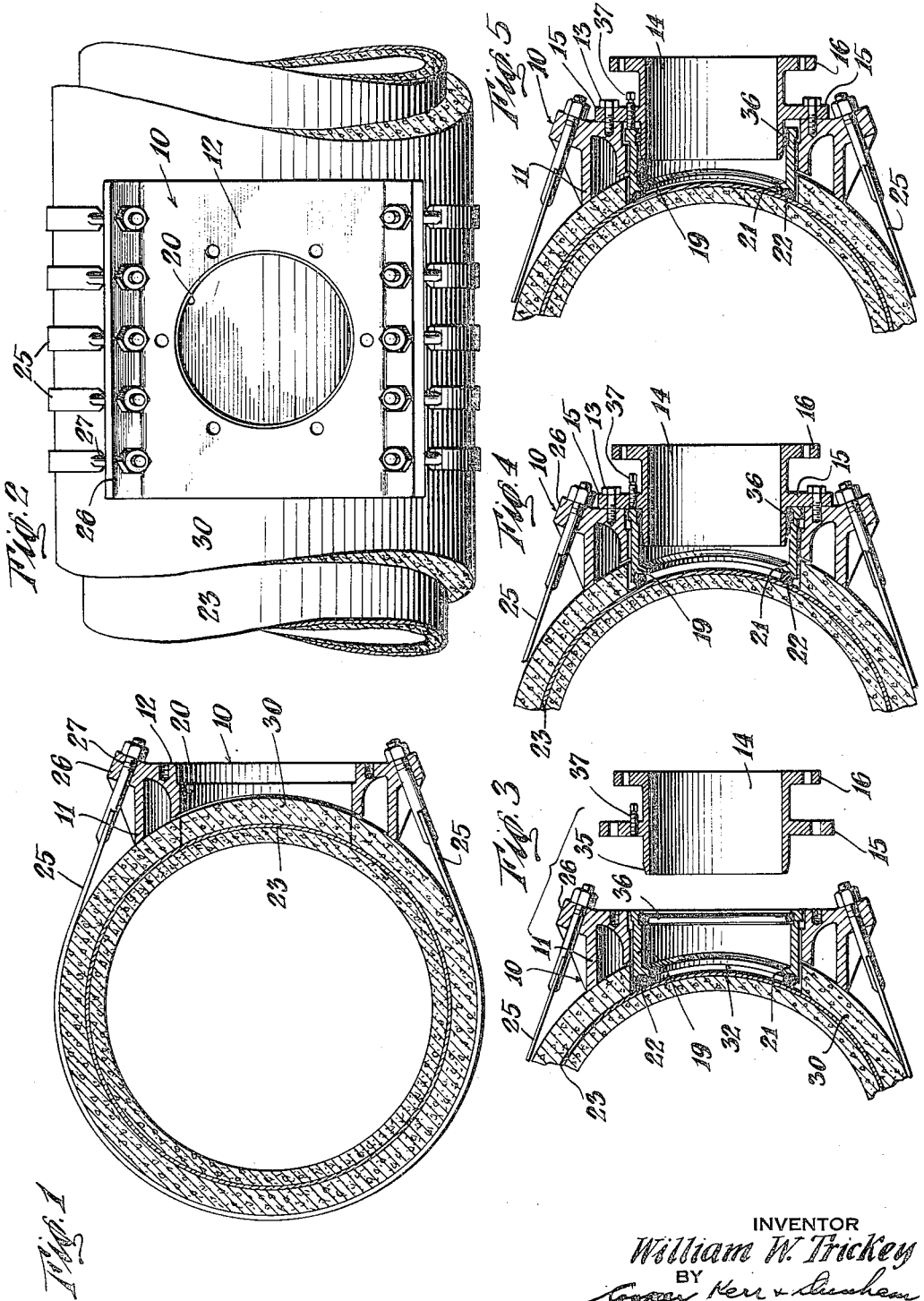
INVENTOR
William W. Trickey
BY
ATTORNEYS

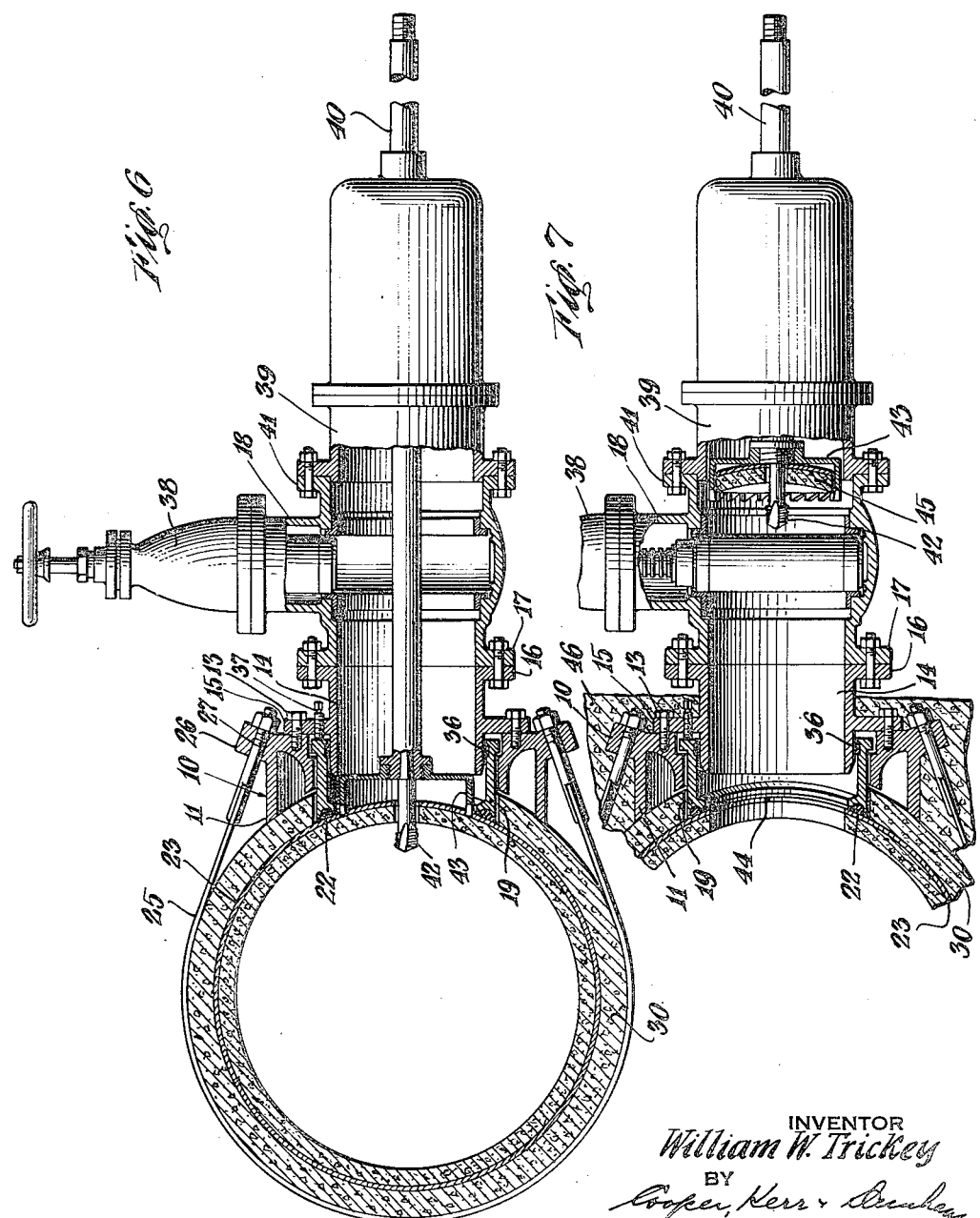

Patented Aug. 11, 1936

2,050,985

UNITED STATES PATENT OFFICE 2,050,985

METHOD FOR TAPPING PIPE

William W. Trickey, Verona, N. J., assignor to Lock Joint Pipe Company, East Orange, N. J., a corporation of New Jersey Application January 29, 1934, Serial No. 708,799

2 Claims. (Cl. 77—42)

This invention relates to a method and apparatus for tapping pipes, and more particularly to apparatus for making under pressure a branch connection with a reinforced concrete pipe of the steel cylinder type.

Among the objects of the invention is to provide a novel method and apparatus for making a branch connection to a pipe line of reinforced concrete steel cylinder pipe without reducing the flow of water or pressure within the pipe line.

Another object of the invention is to provide apparatus for making a branch connection with a reinforced concrete steel cylinder pipe which supports the cutting tool, valve and end of branch pipe line from the outside of the concrete pipe so as to obviate direct attachment to and resulting strains upon the reinforcing embedded within the concrete pipe.

Another object of the invention is to provide apparatus which has provisions for sealing the branch connection to be attached thereto against the metallic reinforcing cylinder which forms an integral part of the pipe to which the branch connection is to be made; and to provide apparatus which is not limited in usefulness because of the unavoidable variation in thickness of the concrete which constitutes the covering material upon the outside of the steel reinforcing cylinder.

Other objects and advantages of the invention will be described hereinafter in the specification and in the claims which follow.

In the drawings, Fig. 1 is a section through line 1—1 of Fig. 2 showing the location for making the branch connection.

Fig. 2 illustrates the saddle by which the apparatus is secured to the outside of the main pipe.

Fig. 3 is a sectional detail of parts of the apparatus with a connector pipe ready for assembly.

Fig. 4 is a showing similar to Fig. 3 with the connector pipe mounted in position upon the saddle.

Fig. 5 is a similar showing of the apparatus in condition for mounting a valve.

Fig. 6 is a sectional view illustrating the valve mounted upon the connector pipe and the manner of tapping the main pipe.

Fig. 7 is a view of the finished branch connection.

The invention provides for supporting the valve and cutting tools by attachment to the outside of a main pipe line so as to avoid placing undesired stresses upon the steel cylinder of the pipe where the cylinder has been cut for the connection.

In the drawings 10 is a saddle which has an outside wall portion 11 adapted to rest against the outer surface of a pipe. The saddle may be made as a one-piece casting and given such dimensions as will provide the strength necessary for supporting the load of the pipe connection. The portion of the saddle which is opposite the outside of the pipe is given a concave curvature corresponding to the curvature of the outside circumference of the pipe to which the saddle is to be attached, and preferably it is so proportioned that only the wall portion 11 will bear against the outside surface of the pipe. The saddle is provided with a flat surface 12 which is tapped to receive machine screws 13 (Fig. 4) by which a connector pipe 14 may be secured to the saddle. The connector pipe is provided with a flange 15 which is to be brought against the surface 12 by means of screws 13 when the connector pipe is secured to the saddle.

The connector pipe 14 is provided with means for connecting a section of pipe or a valve to the apparatus of the present invention, such as flange 16 which is similar to the flange 17 affixed to the valve casing 18 illustrated in Figs. 6 and 7.

While different devices are available for tapping pressure pipe, difficulty has been encountered in making use of such devices for tapping concrete pipe owing to the fact that no satisfactory means had been devised to make a water tight connection between the branch line and the cylinder reinforcement embedded in the main pipe wall. Under the pressures for which reinforced concrete steel cylinder pipe is built a safe water tight connection between a tapping sleeve or saddle and the concrete covering on the outside of the cylinder is not practical due to the inability of the concrete to withhold the water under such pressures. The difficulty in making a water tight connection between the branch line and the steel cylinder also was due, in part, to the irregularities in thickness and curvature of the outside concrete produced under the manufacturing methods generally practiced. The apparatus of the present invention comprises means for making a water tight seal between the branch line and the steel cylinder in the main line.

For providing a seal between the main pipe and the branch line a gland comprising a follower sleeve and gasket or packing is provided. The follower sleeve 19 is adapted to fit within the opening 20 of the saddle and its inner end is provided with a groove 21 for seating a gasket or packing 22 which may be placed in position against the steel cylinder 23 by hand or by affixing the same in the groove. When compressed against the cylinder 23, the gasket is in such a position as to seal against any leakage between the steel cylinder and the follower sleeve. The gasket may be made from any kind of compressible or pliable material which is ordinarily used for sealing purposes, such as, for example, rubber, asbestos, fiber-filled leak gaskets, etc.

When a pipe line is to be tapped the place for making the branch connection is located by mounting the saddle 10 in position in the manner illustrated in Figs. 1 and 2. The saddle is held against the exterior surface of the pipe by means of bands 25 encircling the exterior of the covering material of the pipe. The ends of the bands extend through holes in lugs 26, 27 upon the saddle where they are engaged by nuts.

A hole is then cut through the outside covering material 30 of the pipe by removing a section thereof having an area corresponding with the cross-sectional area of opening 20 in the saddle. This covering material or concrete may be removed by workmen using hand tools or a drilling machine. All the material in this area is removed down to the steel cylinder 23 of the main pipe so that a hole is left similar to that appearing at 32, Fig. 3.

The gland 19 is then mounted within the saddle and moved forward into the position illustrated in Figs. 3 and 4, in which the gasket 22 is in a contacting position with the exterior surface of the steel cylinder 23.

The connector pipe 14 is then mounted upon the saddle by the use of screws 13 in the manner illustrated in Fig. 4. This connector pipe is provided with a tapered surface 35 adapted to engage a gasket or packing 36 and seat the same within its recess in the gland. The gasket may be made of any suitable material for affording a good seal, as is the case for gasket 22, and may be mounted as a ring upon the outside of connector pipe 14 or upon the interior of gland 19 depending upon whether the gland or the connector pipe 14 is provided with the guide or wedging surface. As the screws 13 are tightened, the wedging surface 35 compresses the gasket between the gland and connector pipe so as to create a sealing condition against leakage of fluid between these two members, Fig. 4.

With the connector pipe in position the gland may be moved toward the steel cylinder by means of adjusting screws 37 carried by the connector pipe. The packing 22 at the inner end of the gland is thereby compressed against the exterior surface of the steel cylinder 23, as shown in Fig. 5.

After the apparatus has been assembled in this manner, the valve 38 may be bolted to the flange 16 of the connector pipe and the casing 39 of the cutting device 40 may then be bolted to the flange 41 on the other side of the valve. The designs of the valve and cutting device may be of any standard constructions such as is ordinarily used for tapping pipe. As illustrated in Fig. 6, the cutting device is provided with a tap 42 and a cutting tool 43. As the tool is rotated the tap drills a hole through the remaining wall of the pipe including cylinder 23. The cutting tool 43 likewise cuts through the steel cylinder and pipe lining so as to provide a hole 44 in the steel cylinder and inner lining which is of less diameter than the hole 32 which was previously cut in the covering material. The cutting of hole 44 leaves a core 45 upon the end of the tap which may be withdrawn along with the tap and cutting tool to the rear of the valve and in the position illustrated in Fig. 7. On closing the valve the cutting device may be removed from its mounting upon the valve casing and the branch pipe line connected to the casing in its stead.

Although not indispensable, I prefer to embed the apparatus, including the connector pipe, saddle and main pipe encircling bands in a block of concrete which will effectively protect these parts from corrosion. The manner in which the saddle and connector pipe are thus covered is illustrated at 46 in Fig. 7.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

Claims to the apparatus herein disclosed have been and are being asserted in my copending application Serial No. 50,927, filed November 21, 1935.

What is claimed is:

1. In the method of tapping a reinforced concrete pipe of the steel cylinder type for attaching a branch connection thereto, the steps comprising attaching a saddle member upon the concrete exterior of the pipe and thereby locating the place for making the branch connection by framing an area of the concrete with the walls of an opening in the saddle member, removing the framed area of concrete from the outside surface of the pipe down to the surface of the steel reinforcing cylinder, inserting part of a branch connection within the opening in the saddle and the opening formed by the removal of concrete and in sealed relation with the exposed surface of the steel reinforcing cylinder from which the area of concrete has been removed, and cutting through the steel reinforcing cylinder and remaining pipe wall by removing a portion thereof within the branch connection and without disturbing the sealed relation of the branch connection with the steel reinforcing cylinder.

2. In the method of tapping a reinforced concrete pipe of the steel cylinder type for attaching a branch connection thereto, the steps comprising attaching a saddle member upon the concrete exterior of the pipe and thereby locating the place for making the branch connection by framing an area of the concrete with the walls of an opening in the saddle member, cutting a hole in the framed area of the outer concrete covering constituting a permanent part of the pipe wall of the pipe so as to leave bare an area of the steel reinforcing cylinder outside of the hole to be tapped through the pipe, inserting a sealing gland in the opening thus formed in the concrete and in position against the bared area of the steel reinforcing cylinder, attaching a connector pipe to the saddle member and in sealed relation with the gland to form a branch connection, sealing the connection of the branch connector with the steel reinforcing cylinder against fluid leakage, utilizing the branch connection for supporting a cutting tool, and cutting a hole through the reinforcing cylinder and pipe wall within the sealed connection between the branch connector and the steel reinforcing cylinder.

WILLIAM W. TRICKEY.

CERTIFICATE OF CORRECTION.

Patent No. 2,050,985. August 11, 1936.

WILLIAM W. TRICKEY.

It is hereby certified that error appears in the printed specification of the above numbered patent requiring correction as follows: Page 1, second column, line 60, for the word "leak" read lead; page 2, first column, line 55, for "is" read are; same page, second column, line 32, claim 1, strike out "surface" first occurrence; line 37-38, same claim, strike out "from which the area of concrete has been removed"; line 55, claim 2, strike out "constituting a permanent part of the pipe wall"; line 64-66, same claim, strike out the words and comma "sealing the connection of the branch connector with the steel reinforcing cylinder against fluid leakage,"; line 70, same claim, for "connector" read connection; and that the said Letters Patent should be read with these corrections therein that the same may conform to the record of the case in the Patent Office.

Signed and sealed this 27th day of October, A. D. 1936.

(Seal)

Henry Van Arsdale
Acting Commissioner of Patents.